Nov. 4, 1930.  J. H. ROBERTSON  1,780,540
GOVERNOR MECHANISM
Filed Aug. 8, 1929
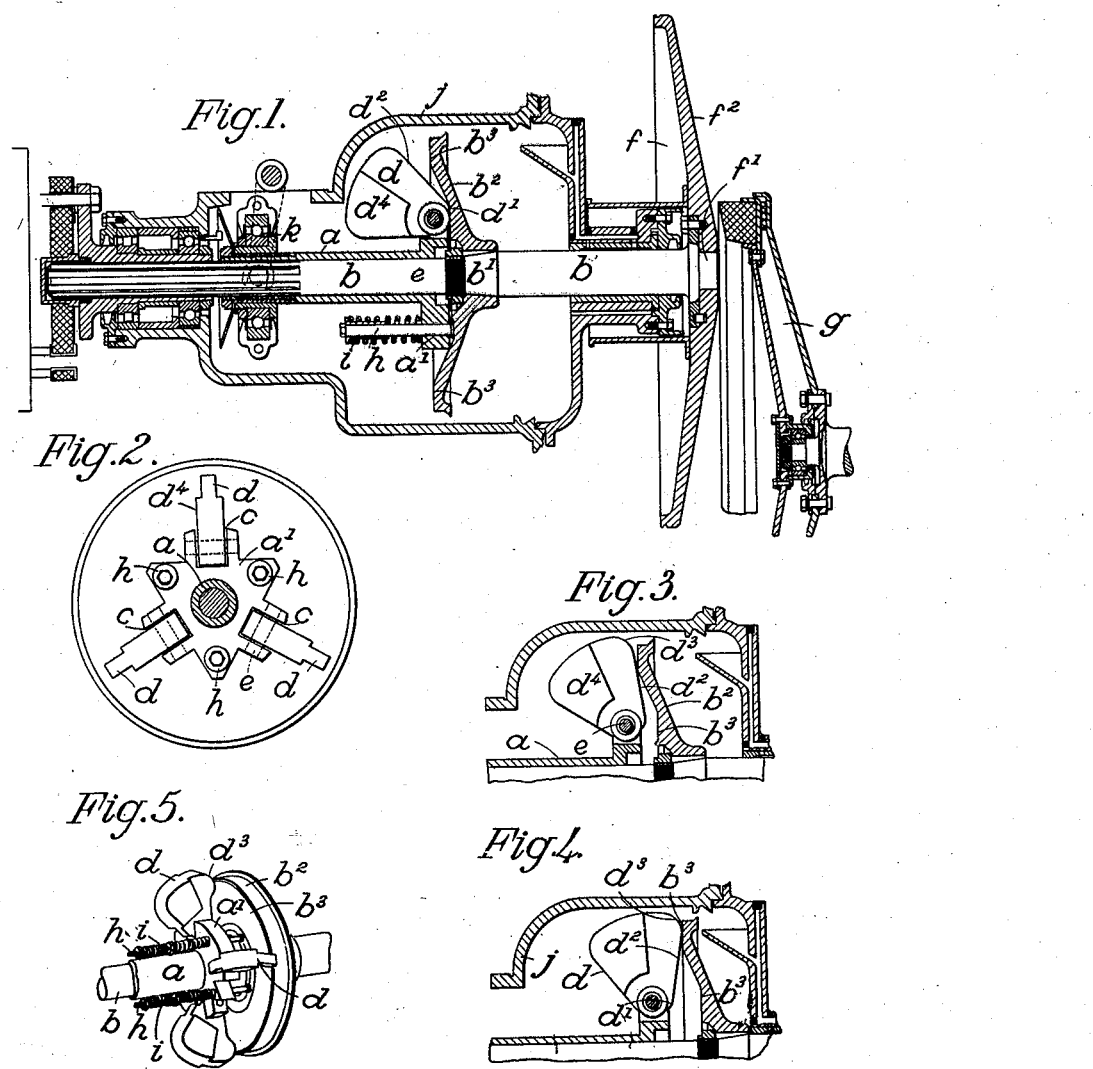

Patented Nov. 4, 1930

1,780,540

UNITED STATES PATENT OFFICE

JOHN HOGG ROBERTSON, OF LONDON, ENGLAND

GOVERNOR MECHANISM

Application filed August 8, 1929, Serial No. 384,447, and in Great Britain December 19, 1928.

This invention relates to centrifugal governor mechanism. It has for an object to provide an improved form of governor mechanism especially adapted for controlling the axial displacement of a slidable driving or other member. The improved mechanism is particularly intended for use in conjunction with an automatically variable friction gearing of the type in which an axially displaceable driving disc or cone co-operates with a driven member normally co-axial therewith but capable of lateral displacement, the relative eccentricity of the two members being determined by the axial displacement of one member in relation to the other.

According to this invention, the governor mechanism comprises an annular support mounted upon the driving or governor shaft, a plate slidably mounted in axial alignment with the driving shaft and connected thereto by keys, splines or the like, a plurality of weighted cams carried by the annular support and adapted to engage the rear face of the slidable plate, and springs or equivalent means holding back the plate towards the annular support and into contact with the cams.

The cams are freely rotatable under the effect of centrifugal force, being mounted upon axes lying approximately tangential to the annular support, their centers of gravity being normally behind said support and their edges projecting on the forward side being suitably shaped to produce the desired rate of advance or axial sliding movement of the plate as the cams rotate upon their axes.

The invention is hereafter described with reference to the accompanying drawings, in which:—

Figure 1 is a sectional elevation of a preferred construction, applicable to an automatic variable gear of the type mentioned, the parts being in the position of rest.

Figure 2 is an end elevation of the governor mechanism with the cover removed.

Figures 3 and 4 are details corresponding to Figure 1, but showing the parts in the half speed and full speed positions respectively.

Figure 5 is a perspective view of a modified construction with the parts in the full speed position.

Referring to Figure 1, the governor mechanism shown comprises a sleeve $a$ slidably secured upon the driving shaft $b$, this sleeve terminating in a flange or annular support $a^1$ formed at its periphery with three equidistant gaps or notches $c$; three cams $d$ are mounted upon spindles $e$ passing through or across the gaps in the central plane of the member $a$.

The driving shaft $b$, in the construction illustrated, represents a secondary shaft in alignment with and connected to the engine shaft by a splined coupling or the like, so as to allow of displacing the shaft $b$ axially by means of the governor for regulating the engagement of the friction gearing according to the engine speed.

The shaft $b$ is formed with a conical seating $b^1$ on which is secured a plate or spider $b^2$ against which the edges of the cams $d$ come into contact when they swing upon their spindles under the action of centrifugal force, due to the rotation of the shaft $b$ and sleeve $a$. The projecting end of the shaft $b$ is screwed to the hub $f^1$ of a disc or plate $f$ which forms the driving member of the friction gearing. This disc or plate $f$ has a conical front face $f^2$ which is adapted to engage at varying radial positions with the laterally displaceable driven member $g$ of the friction gearing.

The cam edges directed towards the plate or spider $b^2$ comprise initial engagement faces or rises $d^1$ of spiral or evolute shape, intermediate engagement faces $d^2$ of less sharply curved or even of straight outline, and final engagement faces $d^3$ of rounded outline, merging into circular arcs concentric with the axes of the cams; these circular arcs continue over a sufficient angle to provide the required masses or lobes $d^4$ for weighting the cams, beyond which they return by rounded or straight contours tangentially to the bosses. The back of the plate or spider $b^2$ with which the cams make contact, may have suitable facings $b^3$ for the engagement of the cams, these facings being illustrated as plain annular surfaces.

The sleeve $a$ has its annular flange $a^1$ slidably guided in relation to the plate $b^2$ by three studs $h$ projecting from the back of the plate and passing freely through holes in the said annular flange, the positions of these studs being intermediate between the cams, as seen in Figure 2. On the ends of the studs, behind the annular member, are fitted coiled springs $i$ which hold the said flange towards the plate, thereby maintaining the cams in engagement. Around the cams and their sliding sleeve support, there is arranged a cover $j$ serving to enclose and protect the governor mechanism.

The end of the sleeve $a$ remote from the cams is fitted with a thrust bearing collar $k$ which can be adjusted longitudinally of the shaft $b$ by means of a hand lever (not shown) so as to regulate the position of the cam-supporting flange $a^1$ in relation to the plate $b^2$ independently of the engine speed.

In the normal position, Figure 1, with the parts at rest, the action of the springs $i$ holds the plate $b^2$ back towards the flanged sleeve $a$, the cams $d$ being in their extreme rearward and inward position. As the parts begin to revolve, the centrifugal force acting upon the cams causes them to turn outwards and forwards, their cam edges $d^1$ $d^2$ pressing the plate $b^2$ forwards against the force of the springs $i$ to slide the shaft $b$ axially, as seen in Figure 3, and thereby to produce engagement of the driving plate $f$ with the driven member $g$ of the friction gearing. In the position of maximum speed, Figure 4, when the centers of gravity of the cams $d$ are approximately in the central plane of the annular flange $a^1$, their rounded final engagement faces $d^3$ will be in contact with the back of the plate or spider $b^2$.

In the modification illustrated in Figure 5, the four cams $d$ have their edges formed with final engagement faces $d^3$ which curve sharply outwards so as to provide an increased travel towards the end of their rotary movement. The plate or spider $b^2$ is here shown with a single annular engaging face $b^3$.

The slidable plate with which the weighted cams engage may itself form the driving member of the friction gearing, as will be readily understood, its front face being made of the desired conical or other shape, and the hub of this plate being extended to connect with the driving shaft through the interior of a socket carrying the annular cam-supporting member or sleeve.

What I claim is:—

1. In a variable friction gearing having a driving member displaceable axially according to its speed, a governor mechanism comprising a rotary support mounted upon the driving shaft, a slidable plate mounted in axial alignment with said shaft, said slidable plate being fast with the axially displaceable member of the gearing, spring means tending to hold said slidable plate towards said rotary support, and a plurality of cams mounted upon said support, said cams being rotatable upon axes lying along the sides of a polygon coaxial with the driving shaft, the centers of gravity of said cams being normally on the side remote from said plate and their edges directed towards said plate being adapted to displace said plate away from said support under the action of centrifugal force, said edges being formed with initial engagement faces of spiral shape and later engagement faces of less sharply curved outline, said faces being adapted to come successively into engagement with said plate as said cams rotate under the action of centrifugal force.

2. In a variable friction gearing having a driving member displaceable axially according to its speed, a governor mechanism comprising a rotary support mounted upon the driving shaft, a slidable plate mounted in axial alignment with said shaft, said slidable plate being fast with the axially displaceable member of the gearing, spring means tending to hold said slidable plate towards said rotary support, and a plurality of cams mounted upon said support, said cams being rotatable upon axes lying along the sides of a polygon coaxial with the driving shaft, the centers of gravity of said cams being normally on the side remote from said plate and their edges directed towards said plate being formed with initial rises of spiral shape, intermediate engagement faces of less sharply curved outline, and final engagement faces of rounded outline, said faces being adapted to come successively into engagement with said plate as said cams rotate under the action of centrifugal force.

In testimony whereof I have affixed my signature.

JOHN HOGG ROBERTSON.